United States Patent
Yokoe et al.

(10) Patent No.: US 8,211,537 B2
(45) Date of Patent: Jul. 3, 2012

(54) RESIN COMPOSITION, AND PREPREG

(75) Inventors: Yasuyuki Yokoe, Shizuoka (JP); Toru Kaneko, Shizuoka (JP); Hiroshi Numata, Shizuoka (JP); Takeshi Shimada, Shizuoka (JP)

(73) Assignee: Toho Tenax Co., Ltd., Tokyo (JP)

( * ) Notice: Subject to any disclaimer, the term of this patent is extended or adjusted under 35 U.S.C. 154(b) by 331 days.

(21) Appl. No.: 12/594,278

(22) PCT Filed: Apr. 11, 2008

(86) PCT No.: PCT/JP2008/057194
§ 371 (c)(1), (2), (4) Date: Feb. 10, 2010

(87) PCT Pub. No.: WO2008/133054
PCT Pub. Date: Nov. 6, 2008

(65) Prior Publication Data
US 2010/0183862 A1    Jul. 22, 2010

(30) Foreign Application Priority Data

Apr. 13, 2007    (JP) ................................ 2007-106594

(51) Int. Cl.
| B32B 27/04 | (2006.01) |
| B32B 27/20 | (2006.01) |
| B32B 27/26 | (2006.01) |
| B32B 27/38 | (2006.01) |
| C08L 63/00 | (2006.01) |
| B29C 70/02 | (2006.01) |

(52) U.S. Cl. ................ 428/297.4; 428/300.1; 428/300.7; 428/301.4; 428/323; 428/327; 428/413; 428/414; 523/440; 525/523; 264/241; 264/257; 264/271.1

(58) Field of Classification Search ................ 264/241, 264/257, 271.1; 428/297.4, 300.1, 300.7, 428/301.4, 323, 327, 413, 414, 415, 417; 523/440; 525/523
See application file for complete search history.

(56) References Cited

U.S. PATENT DOCUMENTS
5,371,152 A * 12/1994 Hoyano et al. ................. 525/423
5,605,745 A * 2/1997 Recker et al. ................. 442/175

FOREIGN PATENT DOCUMENTS
| JP | 61-250021 A | 11/1986 |
| JP | 62-057417 A | 3/1987 |
| JP | 63-162732 A | 7/1988 |
| JP | 4249544 | 9/1992 |
| JP | 7-304968 A | 11/1995 |
| JP | 9-025393 A | 1/1997 |
| JP | 2001-323046 A | 11/2001 |
| JP | 2002-212320 A | 7/2002 |
| JP | 2006-291095 A | 10/2006 |
| JP | 2007-314753 A | 12/2007 |
| WO | WO 2007083084 A1 * | 7/2007 |

OTHER PUBLICATIONS

English Language Abstract for JP4249544.
English Language Abstract for JP2006-291095.
English Language Abstract for JP2001-323046.
English Language Abstract for JP2002-212320.
English Language Abstract for JP9-025396.
English Language Abstract for JP7-304968.
English Language Abstract for JP2007-314753.
English Language Abstract for JP61-250021.
English Language Abstract for JP62-057417.
English Language Abstract for JP63-162732.

* cited by examiner

Primary Examiner — Michael J Feely
(74) Attorney, Agent, or Firm — Norris McLaughlin & Marcus P.A.

(57) ABSTRACT

The present invention discloses a resin composition and a prepreg produced using the resin composition. The resin composition comprises, as essential components: 100 parts by mass of a component (A) which is an epoxy resin; 41 to 80 parts by mass of a component (B) which is thermoplastic resin particles; and 20 to 50 parts by mass (in terms of diaminodiphenylsulfone) of a component (C) which is diaminodiphenylsulfone microencapsulated with a coating agent. The thermoplastic resin particles (B) comprise at least thermoplastic resin particles ($B_1$) having an average particle diameter of 1 to 50 μm and thermoplastic resin particles ($B_2$) having an average particle diameter of 2 to 100 μm at a mass ratio of 3:1 to 1:3. The average particle diameter ratio $D_2/D_1$ of the average particle diameter $D_2$ of the thermoplastic resin particles ($B_2$) to the average particle diameter $D_1$ of the thermoplastic resin particles ($B_1$) is 2 or more.

10 Claims, 1 Drawing Sheet

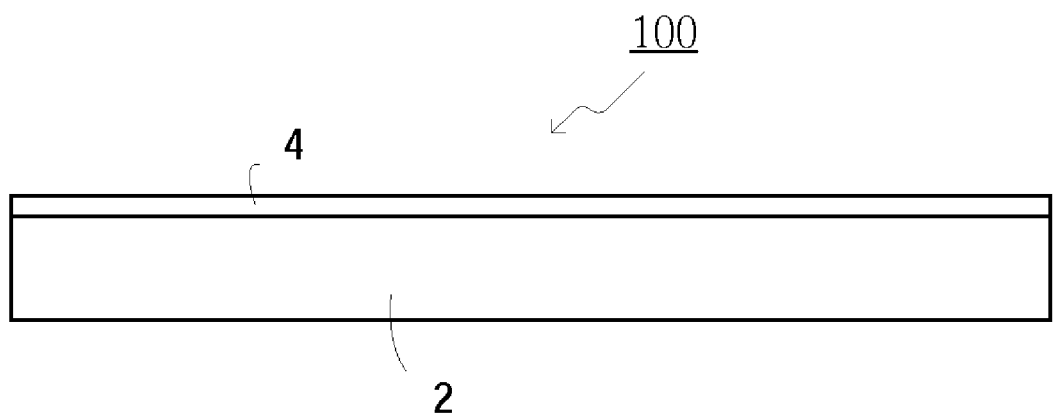

RESIN COMPOSITION, AND PREPREG

TECHNICAL FIELD

The present invention relates to a resin composition used for prepreg production, a prepreg, methods for producing them, and a composite material produced using the prepreg. The resin composition and prepreg of the present invention have long-term storage stability. The composite material produced using the present prepreg comprises a reinforcing fiber and a cured material of the present resin composition impregnated into the reinforcing fiber. This composite material has heat resistance and excellent impact resistance. Explaining more specifically, the present resin composition is a resin composition suited for production of a composite material using a carbon fiber or the like as a reinforcing material. The present resin composition gives a composition material which is excellent not only in mechanical properties and thermal property derived from the epoxy resin and but also in toughness derived from the thermoplastic resin.

BACKGROUND ART

In recent years, composite materials have been produced using a carbon fiber, an aromatic polyamide fiber or the like as a reinforcing fiber. These composite materials, as compared with materials using no reinforcing material, are high in strength and rigidity. Utilizing the high strength and high rigidity, composite materials have been used in a large amount as a structural material for aircraft, etc.

Epoxy resin-based prepregs use an epoxy resin as a matrix resin to be impregnated into a reinforcing fiber. By using an epoxy resin whose main components are an aromatic glycidylamine-based epoxy resin (a main component) and diaminodiphenylsulfone (a curing agent), there can be produced a composite material excellent in heat resistance, mechanical properties, dimensional stability, chemical resistance and weather resistance.

Composite materials produced using an epoxy resin-based prepreg have been known to show good properties, but show short-term storage stability. Further, in these composite materials produced using such a prepreg, the matrix resin has small elongation and is brittle. Since the matrix resin has small elongation and is brittle, the composite material obtained is inferior in toughness and impact resistance. Therefore, it is required to improve conventional composite materials in impact resistance without impairing their heat resistance.

Particularly when such a composite material is used as a primary structural material for aircraft, the composite material undergoes, in some cases, mechanical impact when the aircraft hits small stones in take-off or landing or a tool is accidentally dropped on the aircraft during the maintenance. Therefore, improvement in impact resistance without reduction in heat resistance is an important task for epoxy resin-based composite material.

When a prepreg is cured to produce a composite material (a shaped material) of high impact resistance, it is naturally important to improve the reinforcing fiber (e.g. carbon fiber) itself in elongation. Meanwhile, it is also important to increase the toughness of the matrix resin constituting the composite material. Therefore, a number of attempts have been made for improvement of the matrix resin.

For improvement of the toughness of the matrix resin of composite material, there are considered, for example, a method of mixing a rubber component into the raw material epoxy resin and a method of mixing a high-molecular resin component into the epoxy resin. In the method of mixing a rubber component into the epoxy resin, the composite material obtained is improved in toughness and impact resistance. However, there is reduction in mechanical properties such as heat resistance, compression property, interlaminar shear property. As a result, the amount of the rubber component mixed is restricted and is small depending upon the application of the composite material obtained and, in this case, no sufficient improvement in toughness and impact resistance is obtained.

For mixing, into the raw material epoxy resin, a thermoplastic resin as a high-molecular resin component, there are a mixing method of dissolving a thermoplastic resin in a high-temperature epoxy resin and a mixing method of dissolving a thermoplastic resin in a solvent and then adding an epoxy resin thereto.

In the mixing method of dissolving a thermoplastic resin in a high-temperature epoxy resin, a sudden viscosity increase takes place when the concentration of the thermoplastic resin gets high and also a reduction in tackiness takes place. As a result, the operation of prepreg production becomes very poor.

In the mixing method of using a solvent, the removal of solvent after mixing is a problem. There are further problems, for example, the preparation of solution is complicated and the composite material obtained is low in heat resistance owing to the solvent remaining in a small amount.

For the above reasons, there has been employed a method of adding, to a matrix resin of prepreg, a small amount of a rubber component and a small amount of a high-molecular resin component to improve the prepreg in impact resistance. This method is low reduction in heat resistance but is slight improvement in impact resistance.

In Patent Literatures 1 to 3 are disclosed resin compositions in which a thermoplastic resin is dispersed in an epoxy resin in order to obtain a composite material of high toughness (high impact resistance), and prepregs produced using such resin compositions. However, the composite materials obtained are not improved in impact resistance to a satisfactory level.

The above resin compositions and prepregs contain diaminodiphenylsulfone as a curing agent for epoxy resin, in order to allow the composite material obtained to have high heat resistance. In this case of using the above curing agent, each resin composition and each prepreg obtained have short-term storage stability of about 2 to 3 weeks at room temperature (23° C.). Hence, in order to improve their handleability, high storage stability is required.

In Patent Literature 4 is disclosed a technique of using microencapsulated diaminodiphenylsulfone to make longer the storage stability of prepreg. However, use of a large amount of a thermoplastic resin gives a resin composition of high viscosity, making difficult the production of prepreg. Accordingly, the amount of thermoplastic resin in resin composition becomes 40 mass % or less, and use of a higher amount is difficult practically. Owing to the above reasons, there is a limit in improvement of the impact resistance of composite material.

Patent Literature 1: JP-A-1986-250021 (Claims)
Patent Literature 2: JP-A-1987-57417 (Claims)
Patent Literature 3: JP-A-1988-162732 (page 3, left lower column, line 9 from above to line 1 from below, page 3, right lower column, line 7 from above to page 4, left upper column, line 4 from above)
Patent Literature 4: JP-A-1992-249544 (Claims)

DISCLOSURE OF INVENTION

Technical Problem

The present inventor made a study on the above problems. In the course of the study, the present inventor thought of adding a combination of thermoplastic resin particles of different particle diameters to a resin composition used for prepreg production, and it was found that, with such addition, the viscosity increase of the resulting resin composition was not so large even when the total addition amount of the thermoplastic resin particles was larger than the addition amount conventionally employed.

It was further found that, as described later, when a resin composition sheet and a reinforcing fiber sheet were laminated and heated under pressure to impregnate the resin composition into the reinforcing fiber sheet to prepare a preliminary prepreg, and then a new resin composition sheet and the preliminary prepreg obtained were laminated and heated under pressure and this operation was conducted at least once, the prepreg obtained had high tackiness. The above findings have led to the completion of the present invention.

Hence, the present invention aims at providing a resin composition, a prepreg, methods for producing them, and a composite material comprising a reinforcing fiber and a cured material of the above resin composition impregnated into the reinforcing fiber, all of which solve the above-mentioned problems.

Technical Solution

The present invention which achieves the above aim, are as described below.

[1] A resin composition comprising, as essential components, 100 parts by mass of a component (A) which is an epoxy resin, 41 to 80 parts by mass of a component (B) which is thermoplastic resin particles, and 20 to 50 parts by mass (in terms of diaminodiphenylsulfone) of a component (C) which is diaminodiphenylsulfone microencapsulated with a coating agent, wherein the thermoplastic resin particles (B) comprise at least thermoplastic resin particles ($B_1$) having an average particle diameter of 1 to 50 μm and thermoplastic resin particles ($B_2$) having an average particle diameter of 2 to 100 μm at a mass ratio of 3:1 to 1:3 and the average particle diameter ratio $D_2/D_1$ of the average particle diameter $D_2$ of the thermoplastic resin particles ($B_2$) to the average particle diameter $D_1$ of the thermoplastic resin particles ($B_1$) is 2 or more.

[2] The resin composition according to [1], wherein the coating agent of the component (C) is a polyamide or a modified melamine resin.

[3] A prepreg comprising a reinforcing fiber and the resin composition according to [1], impregnated into the reinforcing fiber.

[4] The prepreg according to [3], which has a water absorption of 35 mass % or less.

[5] A prepreg comprising a resin-impregnated fiber layer made of a reinforcing fiber and the resin composition according to [1], impregnated into the reinforcing fiber, and a resin covering layer made of the resin composition according to [1], covering the outer surface of the resin-impregnated fiber layer, wherein the resin covering layer has a thickness of 2 to 50 μm.

[6] The prepreg according to [5], which has a water absorption of 35 mass % or less.

[7] A method for producing a resin composition set forth in [1], which comprises kneading, at 20 to 90° C., 100 parts by mass of a component (A) which is an epoxy resin, 41 to 80 parts by mass of a component (B) which is thermoplastic resin particles comprising at least thermoplastic resin particles ($B_1$) having an average particle diameter of 1 to 50 μm and thermoplastic resin particles ($B_2$) having an average particle diameter of 2 to 100 μm at a mass ratio of 3:1 to 1:3, wherein the average particle diameter ratio $D_2/D_1$ of the average particle diameter $D_2$ of the thermoplastic resin particles ($B_2$) to the average particle diameter $D_1$ of the thermoplastic resin particles ($B_1$) is 2 or more, and 20 to 50 parts by mass (in terms of diaminodiphenylsulfone) of a component (C) which is diaminodiphenylsulfone microencapsulated with a coating agent.

[8] A method for producing a prepreg, which comprises laminating a resin composition sheet made of the resin composition set forth in [1] and a reinforcing fiber sheet and heating them at 90 to 130° C. under pressure to impregnate the resin composition into the reinforcing fiber sheet.

[9] A method for producing a prepreg comprising a resin-impregnated fiber layer made of a reinforcing fiber and the resin composition according to [1], impregnated into the reinforcing fiber, and a resin covering layer made of the resin composition according to [1], covering the outer surface of the resin-impregnated fiber layer, in which prepreg the resin covering layer has a thickness of 2 to 50 μm, which method comprises laminating a resin composition sheet made of the resin composition set forth in [1] and a reinforcing fiber sheet and heating them at 90 to 130° C. under pressure to impregnate the resin composition into the reinforcing fiber sheet, to form a preliminary prepreg, then, placing a new resin composition sheet on the preliminary prepreg, heating them at 50 to 90° C. under pressure, and repeating this operation.

[10] A composite material comprising a reinforcing fiber and a cured material of the resin composition set forth in [1], impregnated into the reinforcing fiber.

Advantageous Effects

The resin composition of the present invention can contain a large amount of thermoplastic resins with no viscosity increase and accordingly is excellent in operation of prepreg production. Also, the resin composition of the present invention contains a microencapsulated curing agent and accordingly has high storage stability. The prepreg of the present invention produced using the present resin composition is excellent in tackiness and storage stability. The prepreg of the present invention contains a large amount of thermoplastic resins and accordingly can give a composite material excellent in interlaminar fracture toughness and impact resistance.

According to the production methods of the present invention, there can be easily obtained the above resin composition and prepreg each having the above-mentioned excellent properties.

BRIEF DESCRIPTION OF THE DRAWING

FIG. 1 is a side view showing an example of the prepreg of the present invention.

In FIG. 1, 100 is a prepreg; 2 is a resin-impregnated fiber layer; and 4 is a resin covering layer.

BEST MODE FOR CARRYING OUT THE INVENTION

Resin Composition

The resin composition of the present invention comprises, as essential components, 100 parts by mass of a component (A) which is an epoxy resin, 41 to 80 parts by mass of a component (B) which is thermoplastic resin particles, and 20 to 50 parts by mass (in terms of diaminodiphenylsulfone) of a component (C) which is diaminodiphenylsulfone microencapsulated with a coating agent.

In the resin composition of the present invention, the thermoplastic resin particles (B) are dispersed in the epoxy resin (A) in a large amount and uniformly, in order to allow a composite material (a final product) to possess improved toughness. Further, the component (C) which is diaminodiphenylsulfone microencapsulated with a curing agent, is added in order to allow the resin composition to have storage stability. As a result, the composite material obtained shows excellent mechanical properties in impact resistance, toughness, etc. with no sacrifice in heat resistance.

In general, an increase in the addition amount of the component (B) gives a cured resin material of higher impact resistance and higher toughness. Meanwhile, it results in a higher viscosity, making difficult the kneading of the above-mentioned components in production of the resin composition.

In the present invention, in order to solve this problem, the component (B) is constituted by at least two components, i.e. a component ($B_1$) which is thermoplastic resin particles having an average particle diameter of 1 to 50 µm and a component ($B_2$) which is thermoplastic resin particles having an average particle diameter of 2 to 100 µm.

The compounding ratio of the component ($B_1$) and the component ($B_2$) is 3:1 to 1:3 on mass basis.

The ratio $D_2/D_1$ of the average particle diameter $D_2$ of the component ($B_2$) to the average particle diameter $D_1$ of the component ($B_1$) is 2 or more.

By using, in the resin composition, at least two kinds of thermoplastic resin particles different in average particle diameters, thermoplastic resin particles of smaller average particle diameter enter between the gaps formed among thermoplastic resin particles of larger average particle diameter, which enhances the filling efficiency of particles. As a result, the increase in viscosity relative to the increase in addition amount becomes small, making possible the use of the component (B) in a large amount.

Incidentally, there may be contained thermoplastic resin particles having an average particle diameter other than those of the component ($B_1$) and the component ($B_2$), as long as there is no viscosity increase.

That is, when the thermoplastic resin particles ($B_1$) having an average particle diameter of 1 to 50 µm have a smallest average particle diameter of $D_1$ and the thermoplastic resin particles ($B_2$) having an average particle diameter of 2 to 100 µm have a largest average particle diameter of $D_2$, there may be contained at least one kind of thermoplastic resin particles ($B_2$) having an average particle diameter of $D_2$ which is intermediate between the smallest average particle diameter $D_1$ and the largest average particle diameter $D_2$.

As the epoxy resin (A), there can be mentioned, for example, glycidylamine type, bisphenol type and novolac type. These resins, when used in combination with diaminodiphenylsulfone which is a curing agent, gives a composite material having high heat resistance and excellent mechanical properties.

As the glycidylamine type epoxy resin, there can be mentioned, for example, MY-720 (a product of Ciba-Geigy), Epototo YH 434 (a product of Tohto Kasei Co., Ltd.), Ep 604 (a product of Yuka Shell Epoxy K.K.), ELM-120 (a product of Sumitomo Chemical Co., Ltd.), ELM-100 (a product of Sumitomo Chemical Co., Ltd.) and GAN (a product of Nippon Kayaku Co., Ltd.).

The bisphenol type epoxy resin includes, for example, a bisphenol A type resin, a bisphenol F type resin, a bisphenol AD type resin and a bisphenol S type resin. Specifically, there can be mentioned, for example, Ep 815, Ep 828, Ep 834, Ep 1001, Ep 807 (these are products of Yuka Shell Epoxy K.K.), Epomix R-710 (a product of Mitsui Petrochemical Industries, Ltd.) and EXA 1514 (a product of Dainippon Ink and Chemicals, Incorporated).

As the novolac type epoxy resin, there can be mentioned, for example, Ep 152, Ep 154 (these are products of Yuka Shell Epoxy K.K.), DEN 431, DEN 485, DEN 438 (these are products of Dow Chemical) and Epiclon N 740 (a product of Dainippon Ink and Chemicals, Incorporated). As the cresol novolac type epoxy resin, there can be mentioned, for example, Araldite ECN 1235, ECN 1273, ECN 1280 (these are products of Ciba-Geigy), and EOCN 102, EOCN 103, EOCN 104 (these are products of Nippon Kayaku Co., Ltd.).

The alicyclic epoxy resin includes, for example, Araldite CY-179, CY-178, CY-182 and CY-183 (these are products of Ciba-Geigy). The urethane-modified bisphenol A epoxy resin includes, for example, Adeka Resin EPU-6 and EPU-4 (these are products of Asahi Denka Kogyo K.K.). Use of such an epoxy resin gives a composite material excellent in flexibility and enables production of a resin composition having good adhesion to reinforcing fiber.

The above epoxy resin is not compatible with the component (B); phase separation takes place; the fine particles of thermoplastic resins are separated in the epoxy resin; as a result, there is improvement in impact resistance.

As the thermoplastic resin particles (B), there can be mentioned particles of, for example, polyetherimide (PEI), polyethersulfone (PES), polysulfone, polycarbonate, polyetheretherketone, polyamide (e.g. nylon 6, nylon 12 or amorphous nylon) or polyaramid. In particular, particles of polyetherimide, polyethersulfone or polysulfone are excellent in heat resistance and are suitable for use in the present invention.

These resin particles may be a blend of appropriate proportions, or particles of copolymer.

As the thermoplastic resin particles is used, as mentioned previously, a combination of a plurality of kinds different in average particle diameter, in order to obtain a higher filling efficiency. The ratio of different average particle diameters is preferably 2 or more, more preferably 2 to 50, particularly preferably 2 to 30. As to the compatibility of the components ($B_1$) and ($B_2$) with the epoxy resin, there is no particular restriction. However, it is particularly preferred that the component ($B_1$) is soluble in the epoxy resin and the component ($B_2$) is insoluble, under the conditions used in production of composite material (generally, 130 to 180° C. and 1 to 3 hours).

The component (C), which is diaminodiphenylsulfone microencapsulated with a coating agent (abbreviated as mc-DDS), is a curing agent for the epoxy resin (A). In order to prevent the reaction with the epoxy resin at room temperature, the component (C) is diaminodiphenylsulfone particles whose surfaces are coated with a substance low in reactivity with the epoxy resin. The coating is conducted utilizing a physical or chemical bonding force.

As the diaminodiphenylsulfone, there can be mentioned, for example, 3,3'-diaminodiphenylsulfone, 3,4'-diaminodiphenylsulfone and 4,4'-diaminodiphenylsulfone.

As the coating agent for coating the surfaces of the diaminodiphenylsulfone particles, there is preferred such a thermoplastic resin or thermosetting resin as, when the resin is coated on the diaminodiphenylsulfone particles and the coat undergoes a temperature of 130 to 200° C. and a pressure of 98 to 490 kPa (1 to 5 kgf/cm$^2$), the coat is destroyed and loses a function as capsules. With the destruction of the coat, the diaminodiphenylsulfone is released out of the capsule. As specific example of the coating agent, there are mentioned a polyamide, a modified urea resin, a modified melamine resin, a polyolefin and a polyparaffin (including its modified product).

These coating agents may be used singly or in combination. There may be used a diaminodiphenylsulfone microencapsulated with a coating agent other than mentioned above. The particle diameters of the component (C) is preferably 1 to 100 µm.

The method for coating the coating agent on the surfaces of the diaminodiphenylsulfone particles includes a solution method, a dry method (both described below), etc.

Solution method: A coating agent is dispersed or dissolved in a solution and then the dispersion or solution is adhered onto the surfaces of diaminodiphenylsulfone particles.

Drying method: A diaminodiphenylsulfone and a coating agent are stirred at a high speed using a high-speed mixer to adhere the coating agent onto the diaminodiphenylsulfone particles by the action of static electricity, and then film formation is made at a high to medium temperature.

Each of these coating methods is a known microencapsulation method.

Preferably, the coating agent is coated on the surface of diaminodiphenylsulfone particles uniformly and as a thin film in order to obtain a composite material of good properties. Preferably, the coating agent is coated on the diaminodiphenylsulfone particles in an amount of 5 to 20 mass %.

By adding, to the component (A) and the component (B), a curing agent, i.e. a diaminodiphenylsulfone microencapsulated with the above-mentioned coating agent, the composite material obtained has good toughness and good impact resistance, although the reason therefor is unknown. As compared with a case of merely adding a mixture of a diaminodiphenylsulfone and a coating agent resin (the former is not microencapsulated with the latter) to the component (A) and the component (B), the case of using a microencapsulated diaminodiphenylsulfone gives a composite material of higher physical properties (see JP-A-1992-249544, Table 1, column of comparison of Example 2 and Comparative Example 5).

In the resin composition and prepreg of the present invention, the reaction of the epoxy resin with the curing agent hardly proceeds at room temperature; therefore, they have longer-term storage stability than a resin composition using, as a curing agent, a diaminodiphenylsulfone which is not microencapsulated. When the present resin composition or prepreg undergoes a given temperature and a given pressure, the coating agent thereof is destroyed, the diaminodiphenylsulfone and the epoxy resin initiate a curing reaction, and a cured material can be obtained.

In combination with the component (C) can be used other curing agent or a curing accelerator to an extent that the storage stability of prepreg or the properties of composite material produced using the prepreg are not impaired. As the other curing agent, there can be mentioned aromatic amines such as metaphenylenediamine, diaminodiphenylmethane and the like; acid anhydrides such as phthalic anhydride, trimellitic anhydride, pyromellitic anhydride and the like; boron trifluoride complexes such as BF$_3$ monoethylamine, BF$_3$ benzylamine and the like; and imidazoles such as 2-ethyl-4-methylimidazole, 2-ethylimidazole, 2,4-dimethylimidazole, 2-phenylimidazole and the like. There may also be used, in combination, urea compounds (e.g. 3[3,4-dichlorophenyl]-1,1-dimethylurea) and organic metal salts (e.g. Co[III]acetylacetonate).

In the present invention, with respect to the use amounts of individual components, the use amount of the component (A) is 100 parts by mass; the use amount of the component (B) is 41 to 80 parts by mass, preferably 50 to 70 parts by mass, more preferably 55 to 65 parts by mass; and the use amount of the component (C) is 20 to 50 parts by mass, preferably 25 to 45 parts by mass.

When the use amount of the component (B) is more than 80 parts by mass relative to 100 parts by mass of the component (A), the resin composition obtained has a high viscosity, making difficult the uniform mixing of the composition. When the use amount of the component (B) is less than 41 parts by mass, the resin has low toughness and the improvement in impact resistance is insufficient. The component (C) is a curing agent for the epoxy resin. Therefore, the component (C) is used stoichiometrically at a ratio of epoxy equivalent:amine equivalent=1:1. Ordinarily, however, the component (C) is used at a ratio of epoxy equivalent:amine equivalent=1:(0.6 to 1.3), in view of the mechanical properties and water absorption of the cured material obtained.

Since the diaminodiphenylsulfone is coated with a coating agent at the particle surfaces, the net amount of the diaminodiphenylsulfone need be determined and used, in consideration of the coating ratio.

When the use amount of the component (C) is less than 20 parts by mass in terms of diaminodiphenylsulfone, the component (A) is cured insufficiently; when the use amount is more than 50 parts by mass, the cured component (A) is high in water absorption. Incidentally, the water absorption is explained later.

To the present resin composition there may be added, other than the above-mentioned essential components, a rubber component (for example, carboxyl group-terminated, butadiene-acrylonitrile copolymer, nitrile rubber, or epoxy-modified polybutadiene rubber) of such a small amount that there is no reduction in heat resistance; a filler (for example, silica powder) of such an amount that there is no reduction in prepreg handleability; a flame retardant (e.g. antimony trioxide); a coloring agent; and so forth. For handleability, there may also be added, in small amounts, a flow-controlling agent such as acrylic polymer [e.g. Modaflow (a product of Monsanto)], and a water repellent (e.g. silicone resin, silicone oil, or vaseline).

To the resin composition there may also be added, as a reactive diluent, polypropylene diglycol diglycidyl ether, phenyl glycidyl ether, etc.

To the resin composition there may also be added, as a flexible epoxy resin, Ep 871, EP 872 (these are products of Yuka Shell Epoxy K.K.), TACTIX 695 (a product of Dow Chemical), etc. There may also be added, as a heat-resistant epoxy resin, EP 1031, Ep 1032 (these are products of Yuka Shell Epoxy K.K.), TACTIX 742 (a product of Dow Chemical), etc.

The present resin composition can be produced, for example, by the following method.

First, individual components are fed into a kneader and then are kneaded with heating, preferably in an inert gas atmosphere. The heating temperature is below the curing-initiation temperature of epoxy resin. The heating temperature is ordinarily 20 to 90° C., preferably 40 to 80° C. When mixing is conducted, it is preferred that the component (A) and the component (B) are stirred until they become an uniform mixture, then the component (C) is added thereto, and stirring is conducted until an uniform composition is obtained.

In this way, up to 80 parts by mass of the thermoplastic resin particles can be compounded into 100 parts by mass of the epoxy resin component. Compounding of the thermoplastic resin particles in an amount of more than 80 parts by mass is not preferred because, even with the case of the high filling efficiency of the present invention method, the composition obtained has an excessively high viscosity, making difficult the kneading operation. Compounding of the thermoplastic resin particles in an amount of less than 41 parts by mass gives a resin of low toughness and insufficient improvement in impact resistance.

Prepreg

The prepreg of the present invention can be produced by impregnating the above-mentioned resin composition into a reinforcing fiber.

As the reinforcing fiber, a carbon fiber, a glass fiber, an aromatic polyamide fiber, etc. are preferred. A mixture thereof may be used. The reinforcing fiber further includes a sheet obtained by arranging reinforcing fibers in one direction or in a plurality of directions, a woven fabric, a non-woven fabric, etc. The thickness of the sheet, woven fabric, non-woven fabric or the like is preferably 0.01 to 3 mm, more preferably 0.1 to 1.5 mm.

It is preferred to use, as the reinforcing fiber, a carbon fiber having a tensile strength of 3,920 MPa (400 kgf/mm$^2$) or more. Use of such a carbon fiber can gives a composite material of improved mechanical properties.

Production of a prepreg by impregnation of the resin composition into a reinforcing fiber can be conducted by the known, so-called hot-melt method.

In the resin composition of the present invention, thermoplastic resin particles (B) are directly mixed into an epoxy resin (A) with no use of solvent and dispersed uniformly. The present resin composition contains no solvent and accordingly can be formed directly into a sheet shape. The resin composition formed into a sheet shape can be used for prepreg production by the hot-melt method. By using a sheet-shaped resin composition (a resin composition sheet), a prepreg containing no residual solvent and having long-term storage stability can be produced. The resin composition sheet has a thickness of preferably 0.005 to 0.5 mm, more preferably 0.01 to 0.2 mm, particularly preferably 0.05 to 0.1 mm.

The storage stability of the prepreg can be evaluated by measuring the tackiness or gel time of the prepreg. With respect to the tackiness, the tackiness of prepreg is compared between right after prepreg production and 5 days later. The tackiness is measured by JIS Z 3284.

With respect to the gel time, the gel time of prepreg at 180° C. is measured right after prepreg production and after standing for 2 months at room temperature. The measurement method is JIS K 6300.

In general, an increase in addition amount of the thermoplastic resin particles gives a resin composition of higher viscosity. When a prepreg is produced using this resin composition of higher viscosity, the prepreg has, in general, a lower tackiness. A prepreg of lower tackiness is inferior in handleability when a composition material is produced therefrom. When, in order to obtain an increased tackiness, the resin composition is not sufficiently impregnated into a reinforcing fiber sheet and is allowed to partially remain on the surface of the reinforcing fiber sheet, there tend to remain, inside the prepreg obtained, pores which are not filled with the resin composition. A composite material produced using such a prepreg has a low strength.

In a method for producing a preferred prepreg of the present invention, first, a resin composition sheet made of the above-mentioned resin composition is laminated on a reinforcing fiber sheet. Then, the laminate of the resin composition sheet and the reinforcing fiber sheet is heated at 90 to 130° C. under pressure. By this operation, the resin composition is impregnated into the reinforcing fiber sheet to form a preliminary prepreg (hot-melt method). Next, on the preliminary prepreg is laminated a new resin composition sheet and the laminate is heated at 50 to 90° C. under pressure, and this operation is repeated. The times of repetition vary depending upon the thickness of the resin composition sheet and the thickness of the reinforcing fiber sheet; however, the times of repetition are ordinarily 1 to 3 and preferably 1 to 2. By this production method, both the improved tackiness and the reduced inside porosity, of prepreg can be achieved. A composite material produced using a prepreg obtained by such a method has high mechanical properties and very high impact resistance.

Incidentally, in general, an increase in viscosity of a resin composition reduces the impregnation of the resin composition into a reinforcing fiber, making it impossible to achieve both improved tackiness and reduced inside porosity in the prepreg obtained.

The resin composition of the present invention contains a large amount of thermoplastic resin particles but has a low viscosity. Therefore, when impregnation is conducted a plurality of times, the formulation of the resin composition sheet impregnated first can be the same as that of the resin composition impregnated next or later. The formulation of the resin composition sheet may be different between first impregnation and second or later impregnation.

In the above method, in production of first preliminary prepreg, there is formed a resin-impregnated fiber layer comprising a reinforcing fiber sheet and a resin composition impregnated into the reinforcing fiber sheet. Then, second or later lamination is conducted, followed by heating under pressure, whereby is formed, on the outer surface of the prepreg, a resin covering layer covered with a resin composition sheet(s) laminated at second time or later. As shown in FIG. 1, the prepreg 100 produced comprises the above-mentioned resin-impregnated fiber layer 2 and the above-mentioned resin covering layer 4.

In the prepreg, the thickness of the resin covering layer is preferably 2 to 50 μm, more preferably 5 to 30 μm. When the thickness of the resin covering layer is less than 2 μm, the prepreg has insufficient tackiness. When the thickness of the resin covering layer is more than 50 μm, the prepreg is low in handleability and molding precision; therefore, such a thickness is not preferred.

The water absorption of the prepreg is preferably 35 mass % or less, more preferably 15 mass % or less, particularly preferably 10 mass % or less. Here, the water absorption has a correlation with the porosity of prepreg and can be determined by a method described later.

The prepreg is as necessary laminated, is subjected to cutting into a desired shape, etc., then is heated to a curing temperature or higher under pressure, whereby a composite material can be obtained. The heating temperature is preferably 130 to 180° C. and the pressure applied is preferably 0.01 to 5 MPa. These production conditions per se are known.

EXAMPLES

The present invention is explained more specifically below by way of Examples. However, the present invention is in no way restricted to these Examples. Incidentally, the evaluation of operating conditions and the measurement of properties were made by the following methods.

[Tackiness]

The tackiness of prepreg was evaluated based on JIS Z 3284, using a tackiness tester of probe tack type, Tackiness Tester Model TAC-II produced by K.K. RHESCA, under the testing conditions of probe diameter $\varnothing$=5 mm, press load=0.98 N (100 gf), press time=60 sec, and peeling speed=30 mm/min.

[Water Absorption]

A prepreg was cut into a size of 100×100 mm, followed by measurement of the mass (W1) of the prepreg. Then, the prepreg was sunk in water in a desiccator. The pressure inside the desiccator was reduced to 10 KPa or lower to replace the air inside the prepreg with water. The prepreg was taken out of the water; the water on the prepreg surface was wiped off; and the mass (W2) of the prepreg was measured. From these measurement data, the water absorption of the prepreg was calculated using the following expression.

Water absorption (%)=[($W2-W1$)/$W1$]×100

W1: mass (g) of prepreg
W2: mass (g) of prepreg after water absorption

Examples 1 to 4 and Comparative Examples 1 to 12

As the component (A), there were used a glycidylamine type epoxy resin (Ep 604) produced by Japan Epoxy Resin, a bisphenol A type epoxy resin (Ep 828) also produced by Japan Epoxy Resin, and a urethane-modified epoxy resin (EPU-6) produced by Adeka.

As the component (B), there were used a polyethersulfone (PES-5003) produced by Sumitomo Chemical Co., Ltd., a polyetherimide (ULTEM 1000-1000) produced by Nihon GE Plastic, a Grilamid (TR-55) produced by EMS-CHEMIE JAPAN Ltd., and a nylon 6 produced by Ube Industries, Ltd.

As the component (C), there were used, in Examples 1 to 4 and Comparative Examples 1 to 6 and 8 to 12, diaminodiphenylsulfone particles of 20 μm in average particle diameter, covered with a coating agent (which was a modified melanine resin) (this component (C) is abbreviated as mc-DDS). The coating ratio of the coating agent to the mc-DDS was 10 mass %.

As the component (C), there were used, in Comparative Example 7, diaminodiphenylsulfone particles (DDS) of 20 μm in average particle diameter, not covered with any coating agent.

The component (A) was weighed in the kinds and amounts shown in Table 1, followed by uniform mixing. Then, the component (B) and the component (C) were added, in this order, to the component (A). They were mixed in a stirrer at 80° C. for 30 minutes to obtain a resin composition for prepreg production.

The resin composition was coated on a release film using a film coater, to produce a resin sheet with a release film, having a unit area weight of 51.2 g/m². As shown in Table 3, the resin compositions of Comparative Examples 8 to 11 contained the component (B) in a large amount, had a high viscosity, and accordingly were difficult to coat on the release film. The resin composition of Comparative Example 12 was not appropriate in the ratio of the component ($B_1$) and the component ($B_2$) and accordingly gave a high viscosity, making kneading impossible. Therefore, in the resin compositions of Comparative Examples 8 to 11, production of resin sheet was impossible and accordingly production of prepreg was also impossible.

Meanwhile, in each of Examples 1 to 4 and Comparative Examples 1 to 7, two resin sheets with release film could be produced with no particular problem, as shown in Tables 1 and 2. Particularly in Examples 1 to 4, production of resin sheet was stable although the use amount of the component (B) was large.

Next, there were arranged, in one direction, carbon fibers [Tenax (registered trade name) UT-500, a product of Toho Tenax, tensile strength=5,000 MPa (510 kgf/mm², elasticity modulus=235 GPa (24×10³ kgf/mm)]. The resulting carbon fiber was interposed between the two resin sheets obtained in each of Examples 1 to 4 and Comparative Examples 1 to 7; they were heated and pressurized at an impregnation temperature shown in Table 1 or 2, at 0.3 MPa. By this operation were obtained unidirectional prepregs in which the carbon fiber content was 190 g/m² and the resin content was 35 mass %.

Each prepreg obtained in Examples 1 to 4 and Comparative Examples 1 to 6 was cut into a given size, and the cut prepreg was laminated to produce two laminates each of 10-layer lamination in 0° direction. In order to give rise to initial crack, a release film was interposed between the above two laminates; and they were combined to obtain a prepreg laminate having a lamination structure $[0]_{20}$. Using an ordinary vacuum autoclave molding method, the prepreg laminate was subjected to molding for 2 hours at a pressure of 0.49 MPa at 180° C. The resulting molding (composite material) was cut into a size of 12.7 mm (width)×304.8 mm (length) to obtain a test piece for mode II interlaminar fracture toughness (GIIC). Using this test piece, GIIC test was conducted. First, the test piece was placed at such a position that the crack produced by the release film was distant from the fulculum by 38.1 mm; and a bending load was applied at a speed of 2.54 mm/min to generate an initial crack. Then, the test piece was placed so that the length of the crack was distant from the fulculum by 25.4 mm; and GIIC test was conducted three times for one test piece. The speed of GIIC test was 2.54 mm/min. The results are shown in Tables 1 and 2.

The test pieces of the prepregs obtained in Examples 1 to 4 showed each a high GIIC; however, the test pieces of the prepregs obtained in Comparative Examples 1 to 6 showed each a low GIIC.

Each of the prepregs obtained in Examples 1 to 4 and Comparative Examples 1 to 6 was cut and laminated to obtain a laminate of lamination structure $[+45/0/-45/90]_{3S}$. The laminate was subjected to molding for 2 hours at a pressure of 0.49 MPa at 180° C., according to an ordinary vacuum autoclave molding method. The resulting molding was cut into a size of 101.6 mm (width)×152.4 mm (length) to obtain a test piece for compression strength after-impact (CAI) test. The test piece was measured for CAI after impact of 30.5 kJ. As a result, as shown in Tables 1 and 2, the test pieces obtained in Examples 1 to 4 showed each a high CAI; however, the test pieces obtained in Comparative Examples 2, 4 and 6 showed each a low CAI.

For the prepregs obtained in Examples 1 to 4 and Comparative Example 6, the water absorption (porosity) based on water replacement was measured. As a result, the prepregs obtained in Examples 1 to 4 showed each a low water absorption; however, the prepreg obtained in Comparative Example 6 showed a high water absorption.

For the prepregs obtained in Examples 1 to 4 and Comparative Examples 1 to 5 and 7, the gel times (PP characteristic) right after production and after 2-month storage at 23° C. were measured. The gel time was measured at 180° C. using a CURELASTOMETER (IIF type, a product of Nichigo Shoji). As a result, in Examples 1 to 4 using mc-DDS as the component (C), as compared with Comparative Example 7 using DDS not covered with any coating agent, the reduction in gel time after two-month storage was small and the storage stability was high.

As is clear from the above results, Examples 1 to 4 using the component (B) in an amount of 41 parts by mass or more showed extremely high values in the interlaminar fracture toughness (GIIC) and compression strength after-impact (CAI) of composite material. Meanwhile, Comparative Examples 1 to 5 using the component (B) in an amount of 40 parts by mass or less showed lower values than in Examples 1 to 4, in the above properties. It has become clear from the above data that the interlaminar fracture toughness (GIIC) and after-impact compression strength (CAI) of composite material is dependent upon the use amount of the component (B) and that the use of the component (B) in a large amount (this is an object of the present invention) is effective. Incidentally, in Comparative Example 6 in which the water absorption was high, the molding obtained had a large number of voids and the CFRP properties were low.

Incidentally, in the "Production" item of each Table, ○ indicates a case of good production and X indicates a case of any trouble during production.

TABLE 1

| | | | Examples or Comparative Examples Examples | | | |
|---|---|---|---|---|---|---|
| | | | 1 | 2 | 3 | 4 |
| Resin formulation | Component A | Ep 604 | 65 | 65 | 65 | 65 |
| | | Ep 828 | 15 | 15 | 15 | 15 |
| | | EPU-6 | 20 | 20 | 20 | 20 |
| | Component B | PES (10 μm) | 15 | 35 | | |
| | | PEI (10 μm) | | | 35 | 35 |
| | | TR-55 (30 μm) | 30 | 30 | 30 | |
| | | Nylon 6 (30 μm) | | | | 30 |
| | Component C | mc-DDS | 45 | 45 | 45 | 45 |
| Impregnation temperature (° C.) | | | 100 | 100 | 100 | 100 |
| Times of impregnation with resin sheet | | | 1 | 1 | 1 | 1 |
| Resin covering layer (μm) | | | 10 | 10 | 10 | 10 |
| Water absorption (%) | | | 15 | 14 | 16 | 15 |
| Production | Resin | | ○ | ○ | ○ | ○ |
| | Resin sheet | | ○ | ○ | ○ | ○ |
| | Prepreg | | ○ | ○ | ○ | ○ |
| PP characteristic | Gel time (min) | | | | | |
| | (Right after production) | | 23 | 25 | 25 | 22 |
| | (After 2-month storage at room temperature) | | 20 | 22 | 22 | 20 |
| CFRP characteristic | GIIC (Mpa) | | 2120 | 2790 | 2420 | 2320 |
| | CAI (MPa) | | 310 | 340 | 320 | 310 |

PP characteristic: prepreg characteristic
CFRP characteristic: composite material characteristic

TABLE 2

| | | | Examples or Comparative Examples Comparative Examples | | | | | | |
|---|---|---|---|---|---|---|---|---|---|
| | | | 1 | 2 | 3 | 4 | 5 | 6 | 7 |
| Resin formulation | Component A | Ep 604 | 65 | 65 | 65 | 65 | 65 | 65 | 65 |
| | | Ep 828 | 15 | 15 | 15 | 15 | 15 | 15 | 15 |
| | | EPU-6 | 20 | 20 | 20 | 20 | 20 | 20 | 20 |
| | Component B | PES (10 μm) | | 35 | | | | | 35 |
| | | PEI (10 μm) | | | 35 | | | 35 | |
| | | TR-55 (30 μm) | | | | 30 | | 30 | |
| | | Nylon 6 (30 μm) | | | | | 30 | | |
| | Component C | mc-DDS | 45 | 45 | 45 | 45 | 45 | 45 | |
| | | DDS | | | | | | | 40 |
| Impregnation temperature (° C.) | | | 100 | 100 | 100 | 100 | 100 | 60 | 100 |
| Times of impregnation with resin sheet | | | 1 | 1 | 1 | 1 | 1 | 1 | 1 |
| Water absorption (%) | | | 10 | 15 | 15 | 16 | 15 | 45 | — |
| Production | Resin | | ○ | ○ | ○ | ○ | ○ | ○ | ○ |
| | Resin sheet | | ○ | ○ | ○ | ○ | ○ | ○ | ○ |
| | Prepreg | | ○ | ○ | ○ | ○ | ○ | X | ○ |
| PP characteristic | Gel time (min) | | | | | | | | |
| | (Right after production) | | 23 | 25 | 25 | 22 | 22 | — | 23 |
| | (After 2-month storage at room temperature) | | 20 | 22 | 22 | 20 | 20 | — | 10 |
| CFRP characteristic | GIIC (Mpa) | | 640 | 1680 | 1700 | 1710 | 960 | 1060 | |
| | CAI (MPa) | | | 270 | | 250 | | 190 | |

TABLE 3

| | | | Examples or Comparative Examples Comparative Examples | | | | |
|---|---|---|---|---|---|---|---|
| | | | 8 | 9 | 10 | 11 | 12 |
| Resin formulation | Component A | Ep 604 | 65 | 65 | 65 | 65 | 65 |
| | | Ep 828 | 15 | 15 | 15 | 15 | 15 |
| | | EPU-6 | 20 | 20 | 20 | 20 | 20 |
| | Component B | PES (10 μm) | 100 | 50 | 50 | 50 | 65 |
| | | PEI (10 μm) | | 50 | | | |
| | | TR-55 (30 μm) | | | 50 | | |
| | | Nylon 6 (30 μm) | | | | 50 | 10 |
| | Component C | mc-DDS | 45 | 45 | 45 | 45 | 45 |
| Times of impregnation with resin sheet | | | 1 | 1 | 1 | 1 | — |
| Production | Resin | | ○ | ○ | ○ | ○ | X |
| | Resin sheet | | X | X | X | X | — |
| | Prepreg | | — | — | — | — | — |

Examples 5 to 8

Each of the resin compositions of Examples 1 to 4 was coated on a release film using a film coater, to produce four resin sheets each with a release film and each having a unit area weight of 25.6 g/m². There were arranged carbon fibers [Tenax (registered trade name) UT-500, a product of Toho Tenax, tensile strength=5,000 MPa (510 kgf/mm²), elasticity modulus=235 GPa (24×10³ kgf/mm²)] to obtain a reinforcing fiber sheet. This reinforcing fiber sheet was interposed between two of the resin sheets each having a unit weight of 25.6 g/m², followed by heating at 120° C. at 0.3 MPa to impregnate the resin composition into the reinforcing fiber sheet, whereby a preliminary prepreg was obtained.

Next, the preliminary prepreg was interposed between two fresh resin sheets each having a unit area weight of 25.6 g/m² and they were heated at 60° C. at 0.1 MPa to impregnate the resin composition into the preliminary prepreg, whereby was obtained a unidirectional prepreg of carbon fiber content of 190 g/m² and resin content of 35 mass %. The prepreg was cut, which indicated neither dry fiber having no resin coated thereon nor fiber disorder and showed good resin impregnation. Further, observation by optical microscope and scanning electron microscope confirmed formation of resin covering layer on the surface of the prepreg. The prepreg showed high tackiness and good handleability. The prepreg was examined for properties according to the same methods as described in Examples 1 to 4. The results are shown in Table 4.

Incidentally, the prepregs obtained in Example 2 and Example 6 (described later) were measured for tackinesses right after production and after 5 days.

The prepregs obtained in Examples 5 to 8, similarly to those obtained in Examples 1 to 4, were extremely high in the interlaminar fracture toughness (GIIC) and compression strength after-impact (CAI) of composite material. From the results, the advantage of two times of impregnation of resin composition for enhancement of component (B) became obvious. As shown in Table 5, impregnation of resin composition of plural times (2 times) under different conditions gave a prepreg of higher tackiness. The prepreg obtained by two times of impregnations had a high tackiness even after 5 days.

The prepregs obtained in Examples 5 to 8 were measured for gel times right after production and after 2 month storage at 23° C. As a result, the prepregs obtained by two times impregnation of resin composition were low in reduction in gel time even after 2 month storage and had high storage stability.

TABLE 4

| | | | Examples or Comparative Examples Examples | | | |
|---|---|---|---|---|---|---|
| | | | 5 | 6 | 7 | 8 |
| Resin formulation | Component A | Ep 604 | 65 | 65 | 65 | 65 |
| | | Ep 828 | 15 | 15 | 15 | 15 |
| | | EPU-6 | 20 | 20 | 20 | 20 |
| | Component B | PES (10 μm) | 15 | 35 | | |
| | | PEI (10 μm) | | | 35 | 35 |
| | | TR-55 (30 μm) | 30 | 30 | 30 | |
| | | Nylon 6 (30 μm) | | | | 30 |
| | Component C | mc-DDS | 45 | 45 | 45 | 45 |
| Times of impregnation with resin sheet | | | 2 | 2 | 2 | 2 |
| Resin covering layer (μm) | | | 15 | 15 | 15 | 15 |
| Production | Resin | | ○ | ○ | ○ | ○ |
| | Resin sheet | | ○ | ○ | ○ | ○ |
| | Prepreg | | ○ | ○ | ○ | ○ |
| PP characteristic | Gel time (min) | | | | | |
| | (Right after production) | | 22 | 26 | 24 | 22 |
| | (After 2-month storage at room temperature) | | 19 | 23 | 21 | 20 |
| CFRP characteristics | GIIC (Mpa) | | 2100 | 2590 | 2320 | 2350 |
| | CAI (MPa) | | 300 | 340 | 320 | 300 |

TABLE 5

| Example No. | Times of impregnation with resin sheet | Tackiness (kPa) After 0 day | After 5 days | After 10 days |
|---|---|---|---|---|
| Example 2 | 1 | 50 | 21 | 22 |
| Example 6 | 2 | 156 | 97 | 100 |

The invention claimed is:

1. A resin composition comprising, as essential components, 100 parts by mass of a component (A) which is an epoxy resin, 41 to 80 parts by mass of a component (B) which is thermoplastic resin particles, and 20 to 50 parts by mass (in terms of diaminodiphenylsulfone) of a component (C) which is diaminodiphenylsulfone microencapsulated with a coating agent, wherein the thermoplastic resin particles (B) comprise at least thermoplastic resin particles ($B_1$) having an average particle diameter of 1 to 50 μm and thermoplastic resin particles ($B_2$) having an average particle diameter of 2 to 100 μm at a mass ratio of 3:1 to 1:3 and the average particle diameter ratio $D_2/D_1$ of the average particle diameter $D_2$ of the thermoplastic resin particles ($B_2$) to the average particle diameter $D_1$ of the thermoplastic resin particles ($B_1$) is 2 or more.

2. The resin composition according to claim 1, wherein the coating agent of the component (C) is a polyamide or a modified melamine resin.

3. A prepreg comprising a reinforcing fiber and the resin composition according to claim 1, impregnated into the reinforcing fiber.

4. The prepreg according to claim 3, which has a water absorption of 35 mass % or less.

5. A prepreg comprising a resin-impregnated fiber layer made of a reinforcing fiber and the resin composition according to claim 1, impregnated into the reinforcing fiber, and a resin covering layer made of a resin composition according to claim 1, covering the outer surface of the resin-impregnated fiber layer, wherein the resin covering layer has a thickness of 2 to 50 μm.

6. The prepreg according to claim 5, which has a water absorption of 35 mass % or less.

7. A method for producing a resin composition set forth in claim 1, which comprises kneading, at 20 to 90° C., 100 parts by mass of a component (A) which is an epoxy resin,
41 to 80 parts by mass of a component (B) which is thermoplastic resin particles comprising at least thermoplastic resin particles ($B_1$) having an average particle diameter of 1 to 50 μm and thermoplastic resin particles ($B_2$) having an average particle diameter of 2 to 100 μm at a mass ratio of 3:1 to 1:3, wherein the average particle diameter ratio $D_2/D_1$ of the average particle diameter $D_2$ of the thermoplastic resin particles ($B_2$) to the average particle diameter $D_1$ of the thermoplastic resin particles ($B_1$) is 2 or more, and
20 to 50 parts by mass (in terms of diaminodiphenylsulfone) of a component (C) which is diaminodiphenylsulfone microencapsulated with a coating agent.

8. A method for producing a prepreg, which comprises laminating a resin composition sheet made of the resin combination set forth in claim 1 and a reinforcing fiber sheet and heating them at 90 to 130° C. under pressure to impregnate the resin composition into the reinforcing fiber sheet.

9. A method for producing a prepreg comprising a resin-impregnated fiber layer made of a reinforcing fiber and the resin composition according to claim 1, impregnated into the reinforcing fiber, and a resin covering layer made of the resin composition according to claim 1, covering the outer surface of the resin-impregnated fiber layer, in which prepreg the resin covering layer has a thickness of 2 to 50 μm, which method comprises laminating a resin composition sheet made of the resin composition set forth in claim 1 and a reinforcing fiber sheet and heating them at 90 to 130° C. under pressure to impregnate the resin composition into the reinforcing fiber sheet, to form a preliminary prepreg, then placing a new resin composition sheet on the preliminary prepreg and heating them at 50 to 90° C. under pressure, and repeating this operation.

10. A composite material comprising a reinforcing fiber and a cured material of the resin composition set forth in claim 1, impregnated into the reinforcing fiber.

* * * * *